United States Patent Office 3,434,491
Patented Mar. 25, 1969

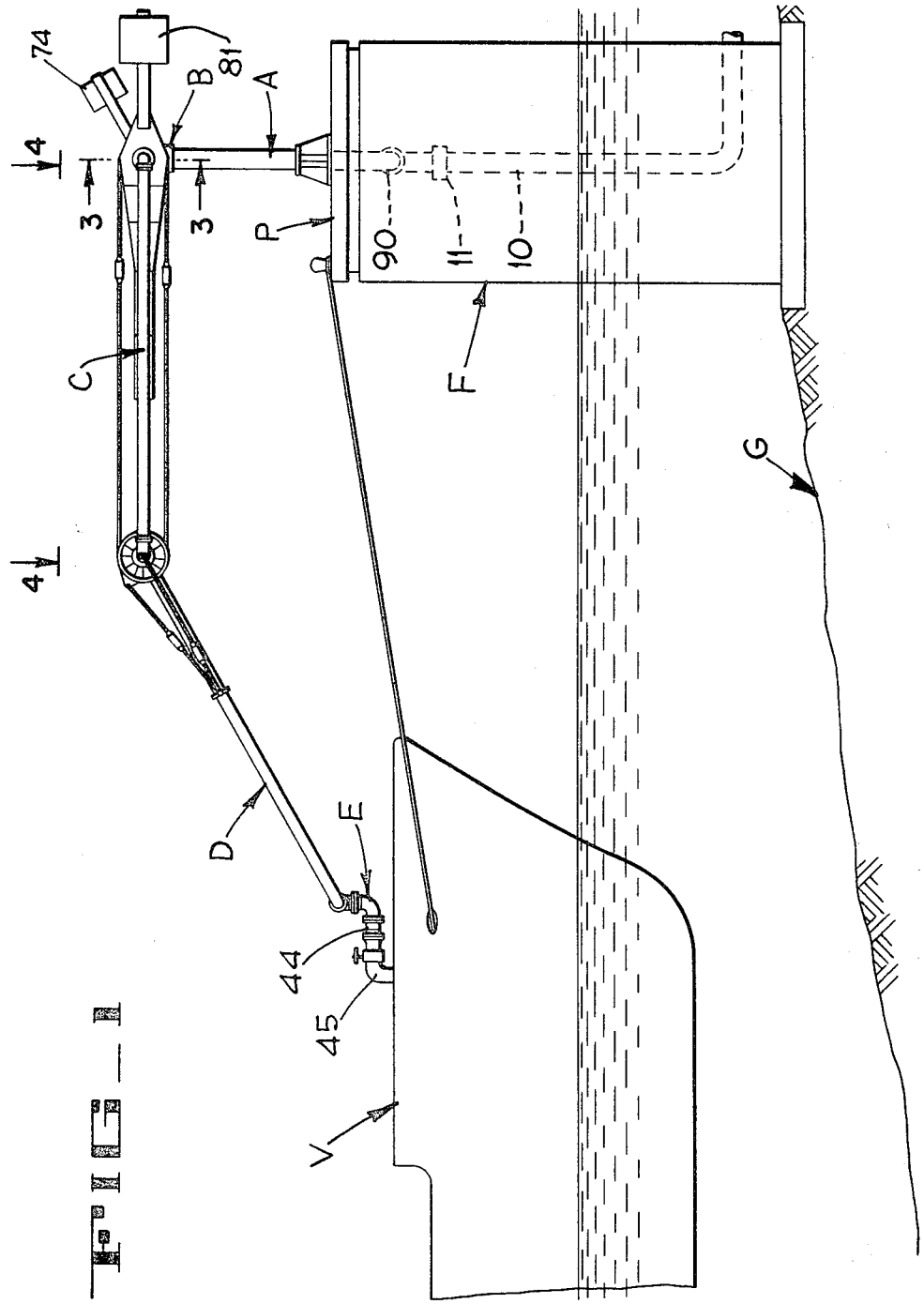

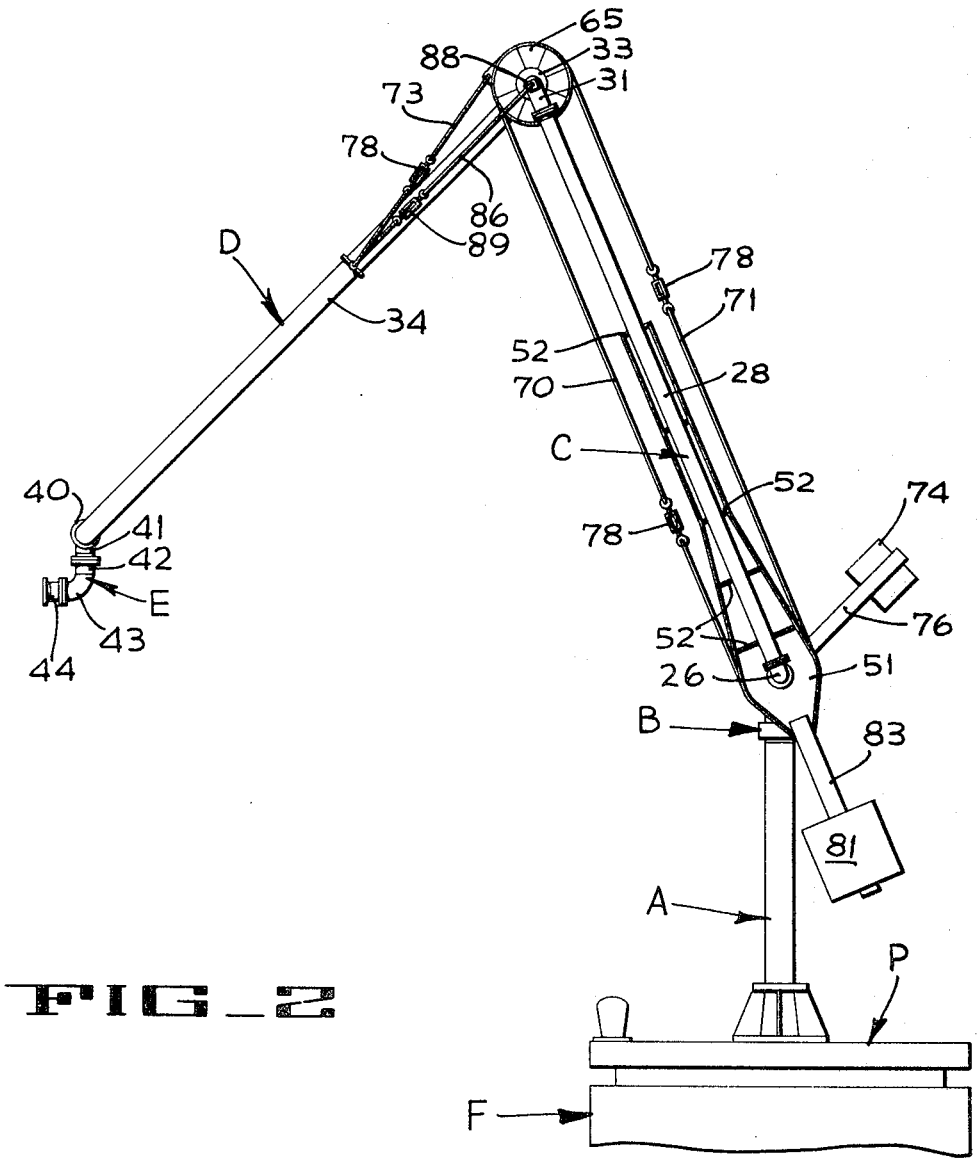

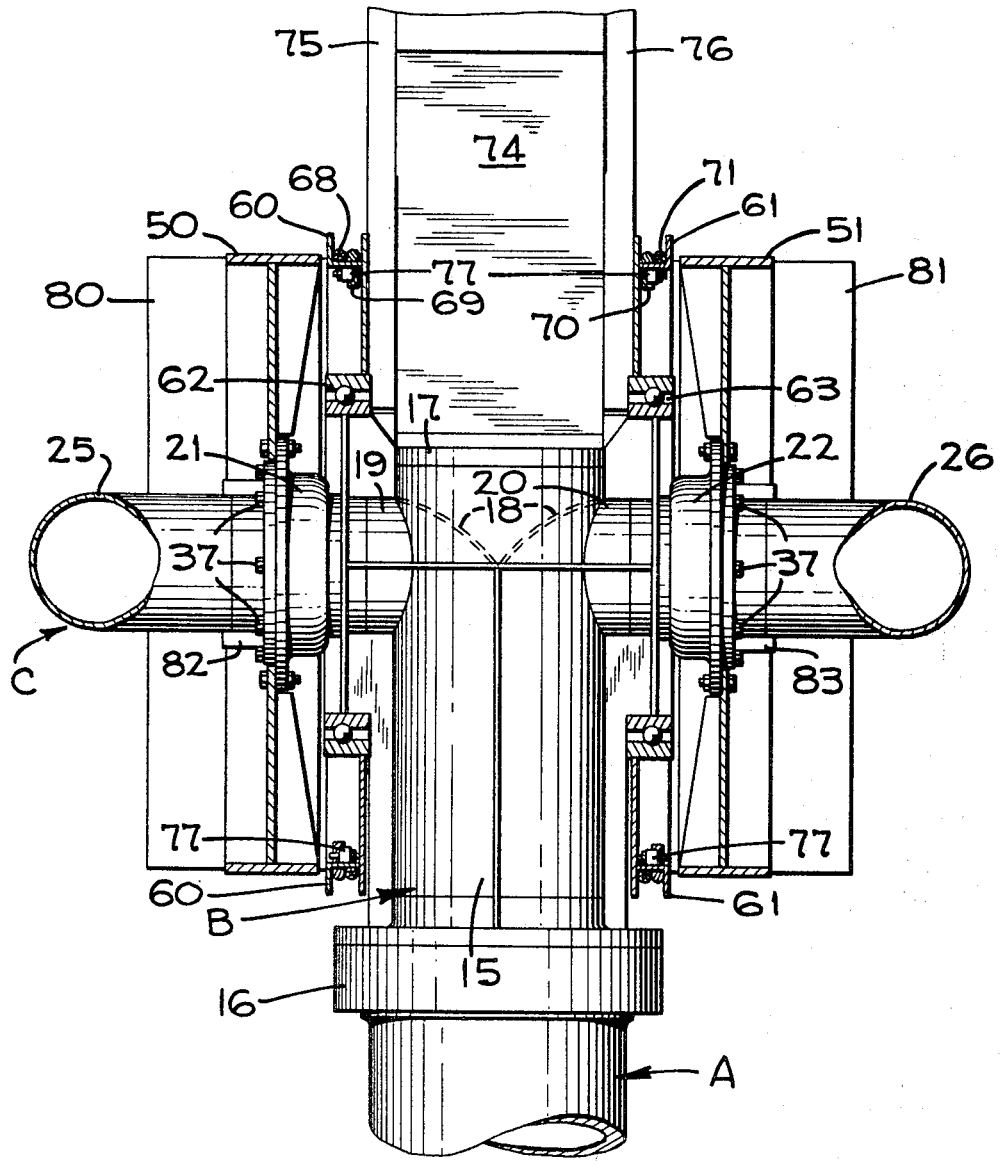

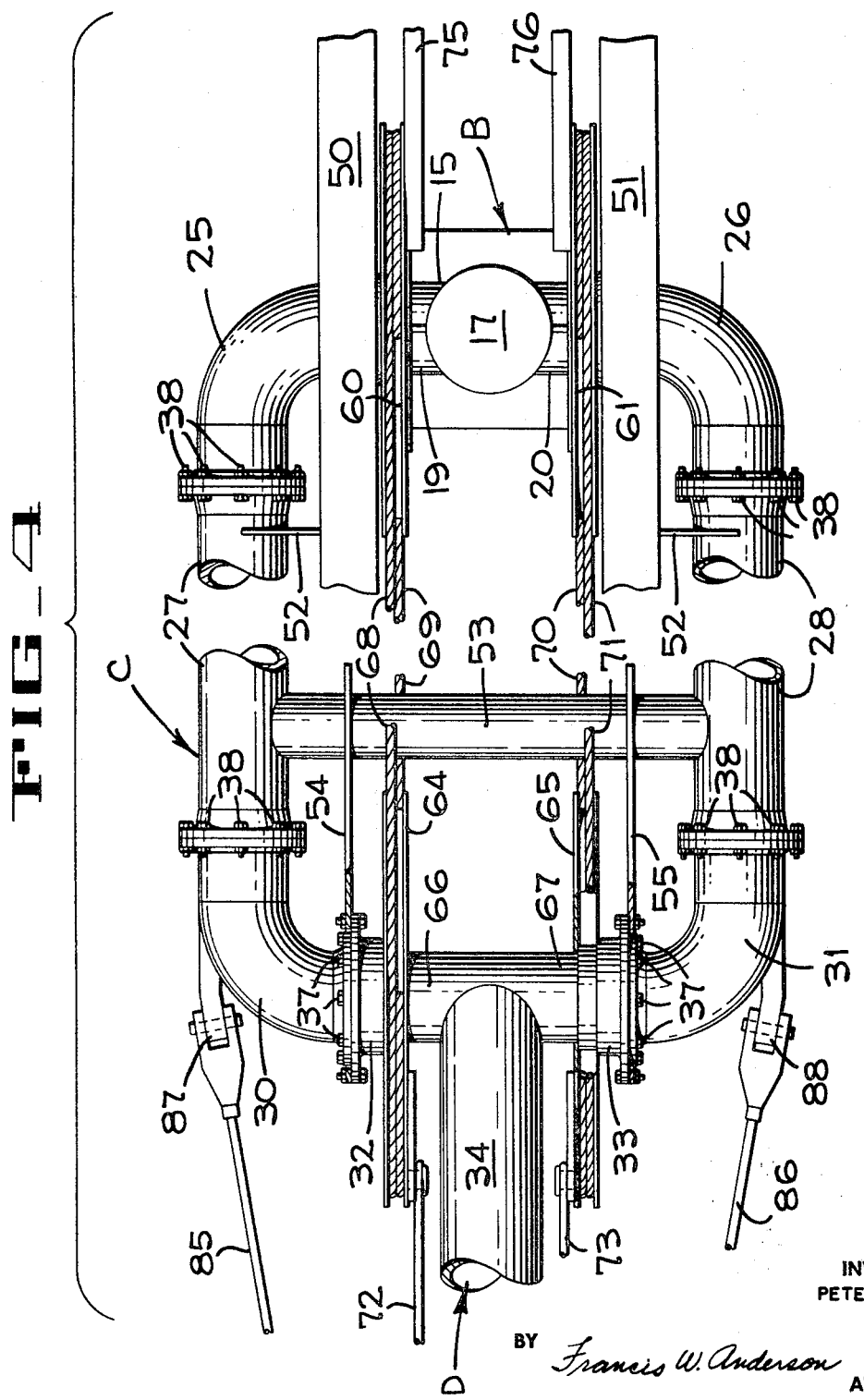

3,434,491
FLUID TRANSFER APPARATUS
Peter J. Bily, Sunset Beach, Calif., assignor to FMC Corporation, San Jose, Calif., a corporation of Delaware
Filed Aug. 4, 1966, Ser. No. 570,227
Int. Cl. F16l 3/00, 55/00, 31/00
U.S. Cl. 137—315                                    5 Claims

ABSTRACT OF THE DISCLOSURE

A double counterbalanced marine loading arm including an inboard arm section having a pair of generally coextensive and parallel tubular conduits rigidly interconnected by a frame structure, a generally T-shaped riser section upon which the inboard arm section is pivotally supported through swivel joints, an outboard arm section pivotally connected through swivel joints to the inboard arm section, and removable elbow-shaped conduit sections at each end of both inboard arm conduits for facilitating access to the swivel joint packings without requiring disconnection of the arm sections and riser.

---

This invention relates to apparatus for transferring fluids between two stations which are movable with respect to one another. The invention particularly relates to a counterbalanced marine loading arm with an especially long reach for servicing vessels moored at off-shore locations.

In recent years many so-called marine "supertankers" of 100,000 deadweight tons or more have been constructed for transporting crude oil, refined petroleum products, and other liquid cargo. Because of their huge size and deep draft these vessels usually are unable to use shorebased docking facilities for cargo transfer, and off-shore deep-water terminals are now provided for them in many areas of the world. The weight of the large diameter flexible hoses used at these off-shore terminals to connect the tanker to the shore line makes them difficult to move and align with the tanker's manifold or standpipe, and they also are limited in their capacity to compensate for changes in relative position of the tanker and the terminal, as when the tanker drifts in response to the current and rises or falls as cargo is transfered.

The comparative handling ease of articulated marine loading arms make them preferred over these flexible hoses, but at off-shore terminals the tanker usually is moored around 100 feet away and thus beyond the reach of these arms. Furthermore, the swivel joints in these arms are subjected to considerable wear and must be repacked or otherwise serviced from time to time, requiring major disassembly of the arm which in turn requires working space, something which usually is not available in sufficient amount at off-shore locations.

Accordingly, an object of the present invention is to provide an improved fluid transfer apparatus.

Another object of the present invention is to provide an improved apparatus for use in establishing fluid-conveying communication between two relatively movable stations.

Another object of the present invention is to provide an articulated marine loading arm for connecting fluid transfer lines to vessels moored as much as 100 feet distance.

Another object of this invention is to provide a new type of off-shore loading terminal with an articulated marine loading arm as the connecting apparatus.

Another object of this invention is to provide an articulated double-arm marine loading apparatus with facilities for servicing the swivels without having to disassemble the arms from each other.

Another object of this invention is to provide a system for transferring vertical force moments in an articulated marine loading arm.

These and other objects and advantages of the present invention will become readily apparent from the following description and the accompanying drawings, in which:

FIGURE 1 is a view in side elevation of the articulated dual arm marine loading apparatus of this invention mounted on an off-shore loading terminal and connecting a shore line to a cargo vessel moored to the terminal.

FIGURE 2 is an enlarged view in side elevation of the marine loading apparatus in a partially retracted position.

FIGURE 3 is an enlarged transverse vertical section taken generally along the line 3—3 of FIGURE 1 showing how the inboard arm is mounted on the riser column.

FIGURE 4 is an enlarged top plan view, partially broken away, looking in the direction of arrows 4—4 of FIGURE 1 and showing the bracing structure force moment transfer system, and removable swivel bearing housings.

Broadly considered, and as illustrated in FIGURES 1 and 2, the fluid transfer apparatus of this invention comprises a riser column A firmly mounted on a platform P, a base assembly B mounted on the riser column A for rotation about a vertical axis, an inboard arm assembly C mounted on the base B for rotation about a horizontal axis, an outboard arm D mounted on the inboard arm C for rotation about a horizontal axis, and a coupling assembly E mounted for universal movement on the outer end of the arm D and providing a means for connecting the apparatus to a vessel. In the usual arrangement platform P is rotatably mounted on a foundation F which sets off-shore on the ocean floor G (FIG. 1) and is connected to the usual storage facilities (not shown) on the land by a conduit 10 which, in turn, is connected to the transfer apparatus through riser A. The rotatable mounting for platform P can be a set of rollers or balls that travel in a circular track on top of the foundation F, so that as the vessel V moves around the terminal in response to changes in current or other forces the platform P will rotate on a vertical axis to maintain the straight line connection between the vessel and the terminal. Along with this rotatable mounting of platform P, the riser A is connected to the conduit 10 through a swivel 11 so that the entire apparatus from these rotation points up is able to pivot on a vertical axis.

The base assembly B, best illustrated in FIGURE 3, comprises a T-shaped conduit 15 mounted for rotation about a vertical axis on top of a swivel 16 which in turn is mounted on the top of riser A. The top end of the conduit 15 is sealed with a cap 17 and arcuate-shaped deflectors 18 inside the bore of the conduit 15 reduce turbulence in the fluid as it flows in the direction of the arrows into lateral outlets 19 and 20.

A pair of trunnion swivels 21 and 22 are mounted on the outlets 19 and 20, and to them are connected elbows 25 and 26, the outer races of the swivels connected to the outlets 19 and 20 and the inner races to the elbows 25 and 26 respectively, to provide rotational movement of the inboard arm C on a horizontal axis through these swivels. A pair of tubular conduits 27 and 28 extend forward from their mounting on elbows 25, 26 to connect with a pair of elbows 30 and 31 which in turn are connected through a pair of swivels 32 and 33 to a T-shaped conduit 34 which extends as the outboard arm D to the coupling assembly E. These swivels 32, 33 provide rotational movement on a horizontal axis between the inboard arm C and the outboard arm D.

The assembly E connected to the outer end of conduit 34 comprises an elbow 41 mounted through a swivel 40 to the conduit 34, and another elbow 43 mounted on the elbow 41 through a swivel 42, the assembly connecting through a suitable pipe coupling 44 to the manifold 45 of the vessel V. This double swivel mounting provides rotation around both a horizontal and a vertical axis to accommodate movement of the ship in any direction. As shown in FIGURE 1, the vessel's manifold preferably is located close to the bow to minimize the distance to the loading terminal, although other locations of the manifold are possible so long as the reach of the loading arm is sufficient.

As shown in FIGURES 3 and 4, the elbows 25, 26 are secured to the housings of swivels 21, 22 by cap screws 37, and to conduits 27, 28 by bolts 38, so that the elbows can be removed for servicing the swivels. In like manner, the elbows 30, 31 are secured to the housings of swivels 32, 33 by cap screws 37, and to conduits 27, 28 with bolts 38, providing removability of these elbows for the same purpose. To maintain the support of the inboard arm C on the base assembly B when elbows 25, 26 are removed, the conduits 27, 28 are rigidly connected to the housings of trunnion swivels 21 and 22 through a bracing system comprising main longitudinal supports 50, 51 bolted to the housings of swivels 21, 22, and transverse struts 52 welded or otherwise rigidly connected to the conduits 27, 28 and the main supports 50, 51. Similarly, to maintain the connection between inboard arm C and outboard arm D when the elbows 30 and 31 are removed, a larger transverse strut 53 is rigidly mounted between the conduits 27, 28 near their outer ends, and longitudinal struts 54 and 55 extend from their rigid mounting on strut 53 to a bolted connection to the housings for trunnion swivels 32, 33. Through this arrangement, each of the swivels 21, 22, 32 and 33 can be serviced without having to remove either the inboard or outboard arms C and D from the apparatus, and the need for working area and storage for these large units is obviated.

A double pantograph sheave and cable system transfers the force moments existant at the rotational axis between the arms C and D to the rotational axis between the arm C and the base B. This system comprises a pair of inner sheaves 60 and 61 mounted through bearings 62 and 63 on the conduit outlets 19, 20 for rotation about a horizontal axis, a pair of outer sheaves 64 and 65 mounted for rotation on a horizontal axis on the lateral inlets 66 and 67 of the conduit 34, a pair of connecting cables 68 and 69 between sheaves 60 and 64 and a similar pair of connecting cables 70 and 71 between sheaves 61 and 65, a pair of force-transferring struts 72 and 73, and an inner counterweight 74 movably mounted on beams 75 and 76 which are themselves rigidly joined to the sheaves 60, 61. The cables extend around their sheaves and their ends are fastened to the sheaves, such as by U-clamps 77, in the conventional pantograph manner, and the struts 72, 73 are pivotally connected to the outer sheaves 64, 65, so that when the sheaves 64, 65 rotate the inner sheaves 60, 61 will rotate in the same direction and to the same degree. The counterweight 74 is positioned on its beams 75, 76 to nullify the moments of force transferred by this pantographic system to the sheaves 60, 61 thus making the outboard arm D easy to manipulate. Turnbuckles 78 are preferably inserted in the cables and the struts to provide a ready method of adjusting them.

A pair of counterweights 80 and 81, movably mounted on their respective beams 82 and 83 which in turn are rigidly mounted to the rearward end of the main supports 50 and 51, counterbalances the sum of the weights of the arms C and D, the coupling assembly E, the fluid in the arm C and about ½ of the fluid in the arm D. These weights will vary with the type of fluid being transferred and the amount thereof contained in the conduits in the arms C and D, but of course moving the counterweights will compensate for this variation.

Each of the three counterweights preferably is connected to a hydraulic system (not shown) for moving it on its supporting beam or beams to adjust the balance of the apparatus. Thus, overbalance and underbalance as well as perfect balance can easily be achieved if desired.

Lateral support to prevent any tendency to sway is given to the outer arm D by sway struts 85 and 86. These struts are rigidly connected to the arm D, and pivotally connected to the ears 87 and 88 on elbows 30, 31, the pivotal connection necessary to permit the struts to move at the ears 87, 88 with the movement of the arm D. Turnbuckles 89 provide a method for adjusting the tension on the struts.

More than one fluid transfer apparatus can be mounted on platform P if additional loading or unloading facilities are required, by providing a branch in the riser column A between the swivel 11 and the platform, as diagrammatically illustrated at 90 in FIGURE 1. Thus two or more connections can be made at one time between the shore line 10 and the vessel V to reduce loading or unloading time.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
 (a) an upstanding, generally T-shaped riser conduit having first and second coaxial upper outlets connected to first and second swivel joints, respectively;
 (b) an inboard arm section including a pair of generally coextensive and parallel tubular conduits rigidly interconnected by a bracing assembly, said bracing assembly including a pair of primary longitudinal struts each of which is rigidly connected to one of said tubular conduits and one of said first and second swivel joints, said primary longitudinal struts also being rigidly interconnected and extending beyond the ends of said tubular conduits to provide support means for a counterweight, said bracing assembly also including a pair of secondary longitudinal struts each of which is rigidly connected to one of said tubular conduits and to one each of third and fourth swivel joints;
 (c) an outboard arm section having a pair of coaxial inlets connected to said third and fourth swivel joints; and
 (d) elbow-shaped conduit sections removably interconnecting said first, second, third and fourth swivel joints with said tubular conduits of said inboard arm to provide a fluid-tight double conduit between said riser and said outboard arm, said elbow-shaped conduit sections being removable from said loading arm without disconnecting said riser from said inboard arm section, or said inboard and outboard arm sections from each other;
  whereby each of said first, second, third and fourth swivel joints can be serviced on the loading arm while the arm is assembled.

2. The loading arm of claim 1 wherein said elbow-shaped conduits are removably connected to the female portions of said swivel joints.

3. The loading arm of claim 1 wherein said primary and secondary longitudinal struts are connected to the female portions of said swivel joints.

4. The loading arm of claim 1 wherein a counterweight is connected to each of the extensions of said primary struts, to counterbalance the loading arm about the common axis of said first and second swivel joints.

5. The loading arm of claim 4 including a pantograph system for counterbalancing said outboard arm section about the common axis of said third and fourth swivel joints.

(References on following page)

References Cited

UNITED STATES PATENTS

| | | | |
|---|---|---|---|
| 506,335 | 10/1893 | Pearson | 285—150 |
| 3,073,343 | 1/1963 | Mowell et al. | 137—615 |
| 3,085,593 | 4/1963 | Sorensen | 137—615 |
| 3,086,367 | 4/1963 | Foster | 137—236 X |
| 3,236,259 | 2/1966 | Ashton | 137—615 |
| 3,239,249 | 3/1966 | Ashton et al | 285—152 |
| 3,244,440 | 4/1966 | Ashton et al. | 285—152 X |

HOUSTON S. BELL, JR., *Primary Examiner.*

U.S. Cl. X.R.

137—615; 141—387; 285—152

UNITED STATES PATENT OFFICE
CERTIFICATE OF CORRECTION

Patent No. 3,434,491                                            March 25, 1969

Peter J. Bily

It is certified that error appears in the above identified patent and that said Letters Patent are hereby corrected as shown below:

Column 4, line 27, before "(a)" insert -- 1. A marine loading arm, comprising --.

Signed and sealed this 14th day of April 1970.

(SEAL)
Attest:

Edward M. Fletcher, Jr.

Attesting Officer

WILLIAM E. SCHUYLER, JR.

Commissioner of Patents